United States Patent [19]

Petitjean

[11] Patent Number: 4,965,880
[45] Date of Patent: Oct. 23, 1990

[54] PRODUCTIO INSTALLATION FOR THE MANUFACTURE OF A PRODUCT

[75] Inventor: Pierre Petitjean, Arisdorf, Switzerland

[73] Assignee: Ciba-Geigy Corporation, Ardsley, N.Y.

[21] Appl. No.: 215,844

[22] Filed: Jul. 6, 1988

[30] Foreign Application Priority Data

Jul. 15, 1987 [CH] Switzerland .......................... 2698/87

[51] Int. Cl.⁵ .............................................. G05B 19/00
[52] U.S. Cl. ...................................... 364/468; 364/138
[58] Field of Search ................ 364/468, 469, 478, 138, 364/139

[56] References Cited

U.S. PATENT DOCUMENTS

| | | | |
|---|---|---|---|
| 4,363,090 | 12/1982 | Garcia | 364/139 |
| 4,408,291 | 10/1983 | Gunzberg et al. | 364/468 |
| 4,472,783 | 9/1984 | Johnstone et al. | 364/478 |
| 4,646,245 | 2/1987 | Prodel et al. | 364/468 |
| 4,669,047 | 5/1987 | Chucta | 364/468 |
| 4,805,111 | 2/1989 | Steidel | 364/138 |
| 4,831,540 | 5/1989 | Hesser | 364/468 |

FOREIGN PATENT DOCUMENTS 2127586 4/1984 United Kingdom .

Primary Examiner—Allen MacDonald
Attorney, Agent, or Firm—Harry Falber

[57] ABSTRACT

In a production installation, all component parts which are required for a synthesis process or manufacturing process, are combined in terms of hardware and software into modular units (8 to 12). Here, on the one hand local fixed modules (8, 46) and mobile modules (9 to 12) are formed, the apparatus and instruments of which are mounted in racks. Control units (33 to 37) are associated with the modular units, which control units in each case receive a programmable module address code, by which each modular unit (8 to 12) identifies itself to the process guiding system (1).

15 Claims, 1 Drawing Sheet

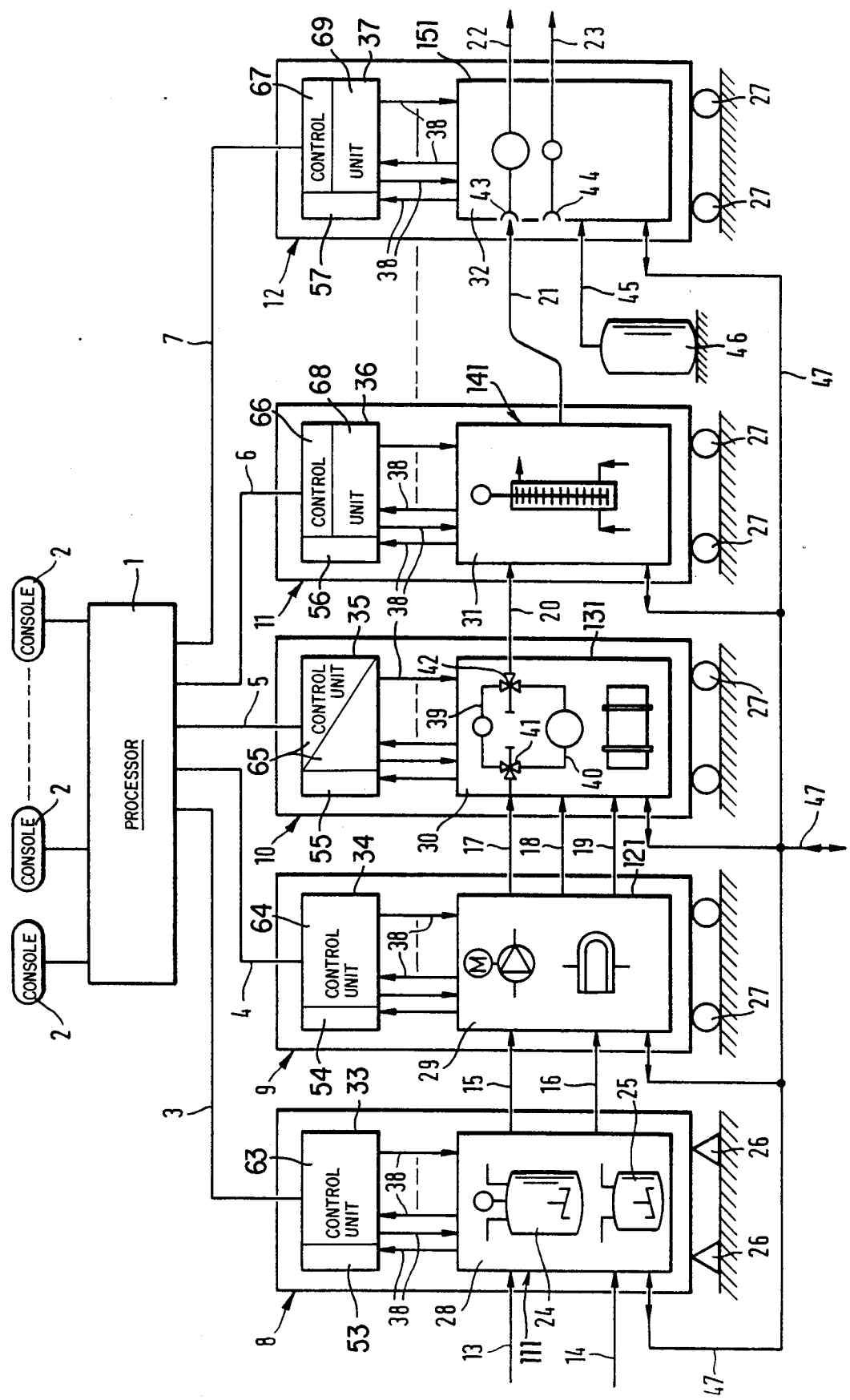

PRODUCTIO INSTALLATION FOR THE MANUFACTURE OF A PRODUCT

BACKGROUND OF THE INVENTION

The invention relates to a production installation for the manufacture of a product, in particular a chemical product or an educt, with a process directing system, which has input/output consoles and process computers, through which system the process stages, which occur in the individual production apparatus and equipment of the production installation for the production of an end product from the raw materials which are fed in, are able to be monitored and controlled by means of sensors and actuators.

Such installations with directing systems are known and are used within the framework of attempts at a further rationalisation in production. If a production installation is to be used not to continuously manufacture the same product, but rather in succession batches of various products, it is necessary to change over the installation accordingly, in which the changeover times on changing the processes for the production of chemical products are frequently in the order of from four to six weeks. During this time, the production installation is out of operation, which is undesirable on grounds of manufacturing economy.

From the GB-A-2 127 586 a method and a device are known for the electronic regulation of a modular system, which in its entirety forms a function unit, and the function modules of which are able to be regulated individually. Self-sufficiently operating regulators are associated with the individual function modules in each case, which regulators are connected with a directing computer, which provides nominal values to the individual regulation circuits for optimization of the overall system according to the case of operation and application, which nominal values are determined by the directing computer according to predetermined criteria for the respective case of application from measurement values and also from external control signals. In an example embodiment of the known device for the regulation of modular systems, the function modules consist of a power engine, a power converter and a driven machine for an application in a power station. In another example embodiment, the function unit is not a power station, but rather a motor vehicle, the first function module of which is a diesel engine and the second function module of which is a gear unit. Self-sufficiently operating regulators are associated with both function modules, which regulators are provided by the directing computer with nominal values corresponding to the respectively existing conditions. As the regulators operate self-sufficiently, in the case of repairs a brief interruption of the supply of new nominal values can be tolerated.

From an article by B. I. Brost, which appeared in Regelungstechnische Praxis 26, (1984) May, Vol. 5, pages 226 to 231, under the title "Prozessführungssystem (=Process directing system) TDC 3000" it is known to connect function modules as carriers of system-specific capacities with each other via a local data network. The process directing system allows the process data from production units to be linked with all commercial information serving to direct the operators, in which all installations of process technology are included as the target of application. As specific function modules, a historic archive module is provided for the storage of all process data, and also an application module is provided, which is a function component which is able to be configured and programmed. All process data and information can be processed and displayed away from the installation in a single operating console. In the process guiding system TDC 3000, the tasks hitherto carried out by a large computer are taken over by decentral function modules, onto which time-intensive calculating functions are distributed.

In Regelungstechnische Praxis 26 (1984) November, Vol. 11, under the title "Procontrol I, ein dezentrales Industrieleitsystem" (=a decentral industry directing system), W. Müller describes a system structure for a digital and decentral industry directing system, which is intended primarily for use in installations in the fields of chemistry, drinking water, sewage, iron and steel production, rolling mills and processing industry, and covers all functions of directing technology in its system components, which are of modular design and are coordinated with each other. With the known decentral industry directing systems, heirarchically graduated, spatially distributed directing installations can be composed, in which at the central site and during operation the configuration data can be provided and read back.

SUMMARY OF THE INVENTION

The invention is based on the problem of creating a production installation which permits a high degree of process flexibility with short changeover times and a high degree of reliability.

This problem is solved according to the invention in that according to the arrangement of a process sequence each individual reaction stage comprises the necessary production apparatus, tubing, electric wiring and other installations, sensors and actuators which are combined for modular process guidance in modular units. Each unit comprises a control unit which is connected with the actuators and sensors of the respective modular unit, and also is connected with the process guiding system. Additionally, at least one of the modular units is constructed as an easily detachable, and an easily transportable assembly.

The production installation according to the invention permits the changeover times to be reduced to approximately one week, one day or even shorter. The modular units consist on the one hand of fixed modules in the form of fixedly installed containers and on the other hand consist of mobile modules, the apparatus and instruments of which are mounted into racks. Depending on the complexity of the processes, i.e. the number of reaction stages and the nature of the reaction which is carried out, for example four to eight mobile modules are required. Hereby it is possible, during a current production or piloting, to prepare other modules for a subsequent process, for which reason the entire production installation may also comprise several mobile modules, which are kept stored in readiness. In order to keep the changeover times as short as possible, the individual modules are already mounted, gauged and tested during a process which is still in progress. Through this, the stock of measurement, control and regulation instruments and also reactors and pumps required in summary is indeed increased, but this disadvantage is more than compensated by the considerable shortening of the changeover times.

The MCR-signals (Measurement-, Control- and Regulation technolgy) of the fixed modules, according to an example embodiment of the invention, are installed directly and fixedly on the process guiding system. The MCR-signals of the individual modular units are digitalized in analog/digital conversion units of the respectively associated control unit or respectively in a separate control modular units, which is placed on the module containing the production apparatus. For example, the signals which are serially converted from the control module or respectively in the control unit are passed via a two-wire line or a light wave conductor to the process computer of the process guiding system.

It is of particular importance that each control unit comprises a memory unit capable of storing a programmable module address code, by which each modular unit identifies itself to the process guiding system. On assembly of the modular units, the type and number of the apparatus, instruments and equipment contained in the respective modular unit are stored in another memory unit of the process guiding system. On starting up the production installation, the parameters, formulae, programs etc. belonging to the respective modular unit are loaded, so that the installation can be controlled accordingly.

BRIEF DESCRIPTION OF THE DRAWING

Further objects and advantages of the present invention will become apparent from the following description of an exemplary embodiment, which is represented in the single drawing, which shows schematically the construction of a production installation according to the invention.

DESCRIPTION OF THE PREFERRED EMBODIMENTS

The production installation represented in the drawing comprises a process guiding system 1, to which several consoles 2 are connected for the operation of the production installation during the preparation for production and during the production itself. These consoles permit the input and output of data which are required for guiding and controlling the process, for providing parameters and for testing.

The process guiding system 1 is connected via bidirectional data lines 3, 4, 5, 6 and 7, which may be constructed for example as two-wire lines or as light wave conductors, with several modular units 8 to 12, which are associated with the process guiding system. The modular units 8 to 12 contain, in each case composed into groups, all the apparatus, sensors and actuators, instruments, tubing, electric wiring and other installations which are required for the manufacture of the desired products.

The raw materials or components which are required for the manufacture of the respective products are passed via supply lines 13 and 14 to the production installation, which comprises several process stages which are constructed as modular units. The substances available at the output of modular unit 8 are transported via conduits 15 and 16 to the second modular unit 9, in which another process step takes place for the manufacture of the desired product or the adduct.

The second modular unit 9 is connected via conduits 17 to 19 to the third modular unit 10, which in turn is connected via a conduit 20 to the modular unit 11, which finally supplies the last modular unit 12 of the series of modular units via a conduit 21. The modular unit 12 comprises output conduits 22, 23, at which the product or adduct which is produced in the various process stages, is available.

Depending on which processes are carried out in the modular units 8 to 12, these are constructed as fixed units, such as modular unit 8, or as mobile units, such as modular units 9 to 12. In the case of a locally fixed modular units, such as unit 8, these are for example fixedly installed containers which comprise e.g. chemical modules 24, 25. In the drawing, the local fixing is shown symbolically by feet 26.

The modular units 9 to 12 are constructed as mobile units; the apparatus and instruments and other constituent parts are mounted into racks which are transportable by fork lifts. The mobility of the modular units 9 to 12 can be increased by providing the bottom of the racks with a number of runners 27.

The modular units 9 to 12 contain the respectively required apparatus, instruments and equipment, which are represented symbolically by way of example in the drawing, in particular pumps, regulation systems, valves, switch valves, dosaging valves, coolers, precoolers, viboreactors, crude reactors, multi-chamber reactors, through-flow reactors etc. The specialist in the art will recognize that the variety of apparatus is very extensive and that for this reason numerous modular units, of differing construction, are possible. According to the processes necessary for the production of the product, the modular units are constructed as synthesis modules 131, pre-cooler modules or cooling modules 151, dosaging modules and/or degasing-modules 141, reactor modules 111, collection modules 121, or the like.

As can further be seen in the drawing, the modular units 8 to 12 not only comprise chemistry modules 28 to 32, but also control units 33 to 37. The control units 33 to 37 are connected via electrical lines 38 with the apparatus, sensors and actuators of the respective modular unit. Preferably the modular units comprise Analog/Digital Conversion units 66 and 67 respectively, for a digitalization of the measurement, control and regulation signals. In this way, if the modular units also comprise process computers 68 and 69 respectively, more or less process control can be conducted by the control units 33 to 37 themselves. In the simplest case of all which is especially suitable for fixed modular units, the signal lines 38 are connected directly and fixedly with the process guiding system 1. Alternatively, it is also possible to construct a control unit, for example the control unit 33 and/or the control unit 34, as a field multiplexer 63 or 64 respectively, in which case the whole effort for process control is conducted by process guiding system 1. Alternatively, the control units may be constructed as, for example, a memory-programmable control system 65.

The control units 35 to 37 of the exemplary embodiment which is described are constructed as intelligent units, which via a plurality of electrical lines 38 exchange information with the sensors and actuators of the chemistry modules 30 to 32 and are able to process more or less independently the information occurring. This results in a reduction in the quantities of data which have to be exchanged via the data lines 3 to 7, and results in relieving the load on the process guiding system 1.

The selection of the modular units to be constructed as fixed units and those to be constructed as mobile racks depends on the nature of the apparatus and the instrumentation required in each case. This applies accordingly for the control units 33 to 37. On changeover of the production installation, depending on the extent of the changeover which is required, it may be sufficient to leave the production installation unchanged, and merely convert the control through the control units and the process guiding system. If this is not sufficient for the conversion of a process, it may be necessary to reassemble individual modular units. If such a reconstruction becomes relatively costly, the modular construction of the production installation allows a modular unit, for example modular unit 11, to be exchanged in its entirety for another modular unit, which has been tested and for which parameters have been provided during a preparation phase, in order to establish, inter alia, regulation values, pressure ranges, temperature ranges and the significance of the electrical lines 38. In this way, the modular construction allows a high degree of flexibility to be achieved, without in each case being forced to intervene directly into the construction of the production installation through an individual reconstruction. Of course, in the case of minor alterations, it is not expedient in individual cases to exchange one modular unit for another, if a mobile module which is already present in the installation can be adapted more rapidly to the new process direction.

The changeover and the tests of the individual modular units 8 to 12 take place expediently in the preparation phase whilst a production or piloting is still in progress. In this way, in particular a gain of piloting-changeover time results.

Owing to the most varied types of process which the design of the installation must handle, there results a diversity of apparatus which are partly to be dimensioned in parallel. These may be combined into modular units in various ways. One possibility consists of providing a parallel construction and a switchover, as shown in the upper part of chemistry module 30. A first branch 39 can be seen here, and a second branch 40, which branches are able to be switched by means of switch valves 41, 42. The branches 39 and 40 differ here, for example, by different pumps, regulation systems, reactors etc. The parallel construction which was mentioned allows a rapid switchover by means of the switch valves 41, 42, without external mechanical work needing to be carried out. Sensors here, together with the control unit 35 permit a monitoring of the path which is used in each case, through the first branch 39 or through the second branch 40. Such a design within the chemistry module 30 therefore leads to a greater expenditure as regards measurement, control and regulation technology.

Another possibility consists of the already mentioned exchange of one modular unit, for example modular unit 11, for another modular unit. Through this, more work results during changeover and after changeover the control of the production installation takes into account the different type of construction of the module which was used for exchange.

Modular unit 12 permits the conduit 21 to be connected selectively to input 43 or to input 44. Through a reattachment of the connections, consequently, a changeover of the production installation can likewise take place, with increased expenditure for measurement, control and regulation technology. Here, via sensors arranged at the inputs 43 and 44, the control unit 37 monitors whether the conduit 21 is connected with the provided connection at input 43 or respectively 44.

As can be seen in the drawing, the chemistry module 32 has a supply line 45, connected with a container 46, which is to be regarded as a fixed modular unit, and which may have instrumentation which is connected directly and fixedly to the process guiding system 1.

So as not to have to pursue a great deal of expenditure for power current installation in the above-mentioned change of unit, provision is made in modular units 8 to 12 to effect the electric distribution in the control unit. Consequently, only a single electrical interface per unit 8 to 12 is required. The control units 33 to 37 consequently serve in each individual case not only exclusively to combine the MCR-signals via a multiplex unit and to supply them to the computer of the process guiding system 1, if necessary via light wave conductors, which may be accommodated in the power current cable.

The modules 8 to 12 not only comprise a single interface for the electrical energy, but also in each case a single interface per unit for compressed air and cooling water or the like, which is shown in the drawing through the lines 47.

The control units 33 to 37 permit a self-identification of the modular units 8 to 12, so that a flexibility is obtained with a minimum of chances for installation errors and with great operational security on changeover. Newly set-up modular units are firstly connected to a testing apparatus, in which a test programme is run through for the module which is to be tested in each case with a corresponding operation. Within the framework of preparation, self-tests and tests take place as to whether all parameters are present according to the process sequence which is planned. Here, in the control units or in the process guiding system, for different processes in each case under a different process number, information can be stored as to how the respective chemistry module 28 to 32 is composed and how and with which parameters the process is to be carried out. After changeover of the installation and the inclusion of the newly set-up modular units, the operation and monitoring of the installation takes place via the consoles 2, in which the information regarding the details of the process is present partly in the process guiding system 1 and partly in the control units 33 to 37. For different methods after the respective changeover, in each case different modular units are provided, in which the control units, which are provided with programmable module address codes for self-identification, can issue accurate answer-back signals to increase operational security, so that the process guiding system 1 can check whether the modules necessary for a particular process with a particular given process number are actually physically present and whether the congifuration of the modular units, as planned for the respective process, was correctly undertaken during preparation.

The data connection between the modular units and the process guiding system does not absolutely have to take place via individual, physical data lines. Wireless communication techniques may also be provided for this, or the data information is transferred through a suitable modulation process via the energy supply lines.

I claim:
1. Production installation for the manufacture of a product in a multistage process, comprising
  (A) a process guiding system having input/output consoles and, connected to the consoles, a process computer for monitoring and controlling said mul- tistage process for the manufacture of said product; and (B) at least two modular units for conducting the respective stages of said process:
  (a) each of said modular units comprising production apparatus, instrumentation, tubing, electrical wiring, sensors, actuators and a control unit, connected to said sensors and actuators, for communicating with said process guiding system; and
  (b) at least one of said modular units being detachable from the rest of said production installation and transportable.

2. Production installation according to claim 1, wherein the non-transportable modular units are fixedly installed containers.

3. Production installation according to claim 2, wherein said fixedly installed containers and said process guiding system are directly and permanently interconnected by a number of signal lines.

4. Production installation according to claim 1, wherein said transportable modular units are mobile racks which are transportable with fork lifts.

5. Production installation according to claim 4, wherein said mobile racks comprise a number of runners.

6. Production installation according to claim 1, wherein each of said modular units contains only one interface for the supply of auxiliary energy, compressed air or cooling water, which is shared by all constituent parts of said modular unit.

7. Production installation according to claim 1, wherein said control units of said modular units and said process guiding system are interconnected by light wave conductors.

8. Production installation according to claim 1, wherein said modular units are constructed as synthesis modules, pre-cooler modules, cooling-modules, dosaging modules, degassing-modules, reactor modules or collection modules.

9. Production installation according to claim 1, wherein each said control unit comprises a memory unit capable of storing a module address code for identification of said respective modular unit.

10. Production installation according to claim 1, wherein said process guiding system and said control units comprise memory units, capable of storing information about the number and nature of the constituent parts of each said respective modular unit, said information being stored upon assembly of said modular units.

11. Production installation according to claim 1, wherein said control units comprise Analog/Digital Conversion units for the digitalization of the monitoring and control signals.

12. Production installation according to claim 1, wherein said control units are field multiplexers or memory-programmable control systems.

13. Production installation according to claim 1, wherein said control units comprise process computers which control the processes occurring in the respective modular unit.

14. Production installation according to claim 1, wherein said control units of said modular units and said process guiding system are interconnected via communication systems.

15. Production installation according to claim 1, additionally containing energy support lines for data transport in either direction between said process guiding system and said control units.

* * * * *